(12) United States Patent
Jeong

(10) Patent No.: US 7,784,821 B2
(45) Date of Patent: Aug. 31, 2010

(54) DEVICE FOR DECREASING PEAK PRESSURE OF AIRBAG

(75) Inventor: Jaehoon Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/323,407

(22) Filed: Nov. 25, 2008

(65) Prior Publication Data

US 2009/0152843 A1   Jun. 18, 2009

(30) Foreign Application Priority Data

Dec. 12, 2007   (KR) ...................... 10-2007-0128704

(51) Int. Cl.
*B60R 21/215* (2006.01)
(52) U.S. Cl. .................... 280/728.3; 280/731
(58) Field of Classification Search ............. 280/728.3, 280/731, 732, 742
See application file for complete search history.

(56) References Cited

U.S. PATENT DOCUMENTS

| | | | |
|---|---|---|---|
| 5,188,737 A * | 2/1993 | Sato et al. .................. | 210/638 |
| 5,288,104 A * | 2/1994 | Chen ......................... | 280/733 |
| 5,478,106 A * | 12/1995 | Bauer et al. ............... | 280/728.3 |
| 5,496,059 A * | 3/1996 | Bauer ....................... | 280/728.3 |
| 5,997,030 A | 12/1999 | Hannert et al. | |
| 6,848,707 B2 * | 2/2005 | Bauer et al. ............... | 280/728.3 |
| 7,036,843 B2 * | 5/2006 | Okamoto et al. .......... | 280/728.3 |
| 7,500,693 B2 * | 3/2009 | Guth et al. ................ | 280/728.3 |
| 2006/0125218 A1 * | 6/2006 | Guth et al. ................. | 280/732 |

FOREIGN PATENT DOCUMENTS

| | | |
|---|---|---|
| JP | 4353050 | 12/1992 |
| KR | 2002 0015593 | 2/2002 |
| KR | 2002 0031939 | 5/2002 |
| KR | 10-2007-0109622 A | 11/2007 |

OTHER PUBLICATIONS

Machine translation of KR20020031939.*

* cited by examiner

*Primary Examiner*—Paul N Dickson
*Assistant Examiner*—Joseph Rocca
(74) *Attorney, Agent, or Firm*—Morgan, Lewis & Bockius LLP

(57) ABSTRACT

The present invention relates to an airbag deployment device for decreasing peak pressure of an airbag in which an inflation tube is provided to a tear seam of a cover and an inflation tube is connected to an inflator through a gas supply tube. When the inflator is operated, the tear seam is torn due to the inflation of inflation tube before the airbag is deployed toward the outside of the cover. Accordingly, when the airbag is deployed, the peak pressure is significantly decreased. As a result, even though a passenger collides with the airbag to be deployed, it is possible to obtain an advantage of decreasing the degree of injury.

12 Claims, 3 Drawing Sheets

DEVICE FOR DECREASING PEAK PRESSURE OF AIRBAG

CROSS-REFERENCE TO RELATED APPLICATION

The present application claims priority to Korean Application Number 10-2007-0128704 filed Dec. 12, 2007, the entire contents of which application is incorporated herein for all purposes by this reference.

BACKGROUND OF THE INVENTION

1. Field of the Invention

The present invention relates to an airbag deployment apparatus of an automobile, and more particularly, to a device for decreasing peak pressure of the airbag during deployment in order to prevent a passenger from being injured due to contact with the airbag.

2. Description of Related Art

When a vehicle collision occurs, persons seated in the vehicle, such as a driver and a passenger, may collide with a steering wheel or a crash pad. Accordingly, the persons are likely seriously injured at the chest and face. For this reason, in recent years, an airbag has been generally mounted in a steering wheel and a crash pad in front of the passenger. Airbags may also be installed in other areas of the vehicle for passenger safety.

The detailed structure or shape of an airbag may vary depending on a mounting position where the airbag is mounted. However, as shown in FIGS. 1A and 1B, the airbag generally has a structure in which an inflator 40 fixed to a housing 20 is provided at the mounting position, and an airbag 30 connected to inflator 40 is provided in a cover 10 while being folded. When a signal corresponding to a vehicle collision is sent to an airbag control unit from a collision detecting sensor, the airbag control unit sends an inflation signal to inflator 40 in order to operate inflator 40. After that, inflation gas generated from inflator 40 quickly inflates airbag 30, and airbag 30 is deployed into a vehicle cabin while a tear seam 11 of cover 10 is torn due to the inflation pressure of the airbag 30.

Meanwhile, when tear seam 11 is torn, the pressure of airbag 30 becomes the peak like (A) of FIG. 4.

Therefore, if a passenger is close to the airbag 30 when airbag 30 tears tear seam 11 and is deployed, the passenger could be seriously injured due to the strong hitting by the airbag 30.

The information disclosed in this Background of the Invention section is only for enhancement of understanding of the general background of the invention and should not be taken as an acknowledgement or any form of suggestion that this information forms the prior art already known to a person skilled in the art

BRIEF SUMMARY OF THE INVENTION

Various aspects of the present invention are directed to providing a device for decreasing peak pressure of an airbag when the airbag is deployed while tearing a tear seam of a cover in order to reduce the risk of injury to a passenger from contact with the airbag during or after deployment.

In various embodiments, an apparatus for decreasing peak pressure of an airbag may include an airbag; an airbag cover receiving the airbag therein to protect the airbag; a tear seam formed on the airbag cover and configured to be torn by pressure applied from the airbag; and a previously-pressing member displaced at the tear seam.

The tear seam may be configured to be torn by a pressure applied by the previously-pressing member before the airbag fully expands or during deployment. The tear seam may be formed at a lower portion of the airbag cover and may have a smaller thickness than that of the airbag cover.

The tear seam may be formed at a lower portion of the airbag cover, the tear seam having a smaller thickness than a thickness of the airbag cover. The tear seam may include at least two lateral sides having an acute angle therebetween to form the small thickness and receives the previously-pressing member therebetween.

The previously-pressing member may be pre-compressed with a predetermined elastic force. The previously-pressing member may be compressed before assembly adjacent at the tear seam. The previously-pressing member may be supplied with a part of a gas provided to the airbag to apply the pressure to the tear seam.

The previously-pressing member may include an inflation tube that is provided near the tear seam. The inflation tube may be connected to an inflator that supplies gas to the airbag by a gas supply tube.

The inflation tube may be mounted by a fixing film coupled to the airbag cover. The fixing film may be made of a material having tensile strength larger than that of the tear seam.

The inflation tube may have a gas receiving volume smaller than that of the airbag so that the response time of the inflation tube is shorter than that of the airbag as the gas is supplied from an inflator thereto. The previously-pressing member may be supported by a fixing film coupled to a lower portion of the airbag cover.

The previously-pressing member may be supplied with a part of gas provided to the airbag and applies the pressure to the tear seam.

The previously-pressing member may be provided at the tear seam that is provided at central portion of the airbag cover. The previously-pressing member may be provided along the entire tear seam that is provided throughout the lower portion of the airbag cover in a predetermined pattern.

Various aspects of the invention are directed to an airbag deployment system for decreasing peak pressure of an airbag including a device for decreasing peak pressure of an airbag in accordance with the present invention.

Various aspects of the invention are directed to a passenger vehicle including a device for decreasing peak pressure of an airbag in accordance with the present invention. The passenger vehicle may include an airbag deployment system including the device.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
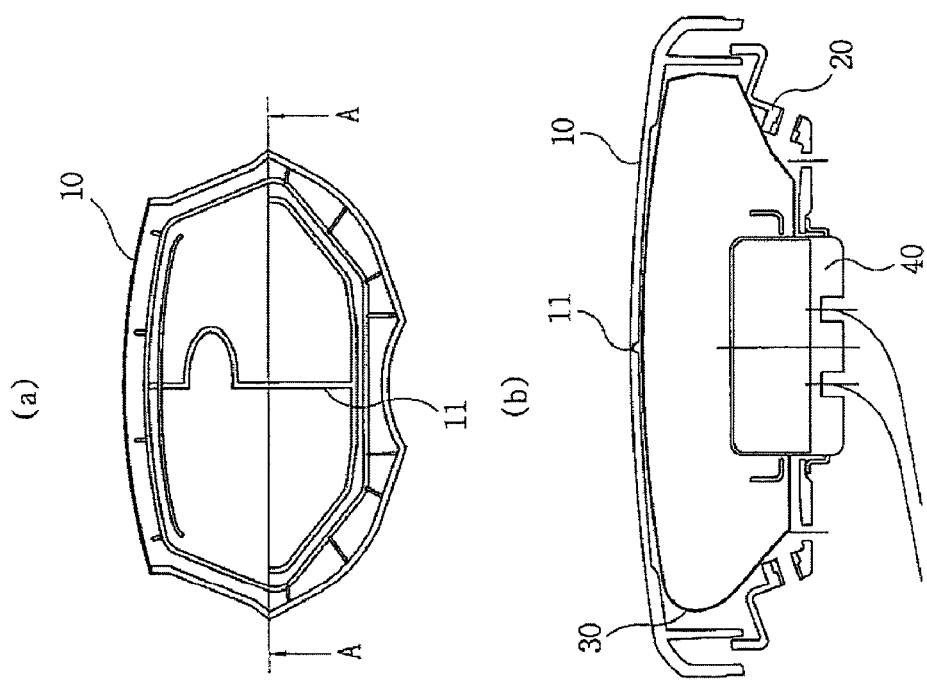
FIG. 1A is a schematic view of a lower portion of an airbag cover of a conventional airbag system.
FIG. 1B is a plan cross-sectional view along A-A of the airbag system of FIG. 1A.
Figure 2:
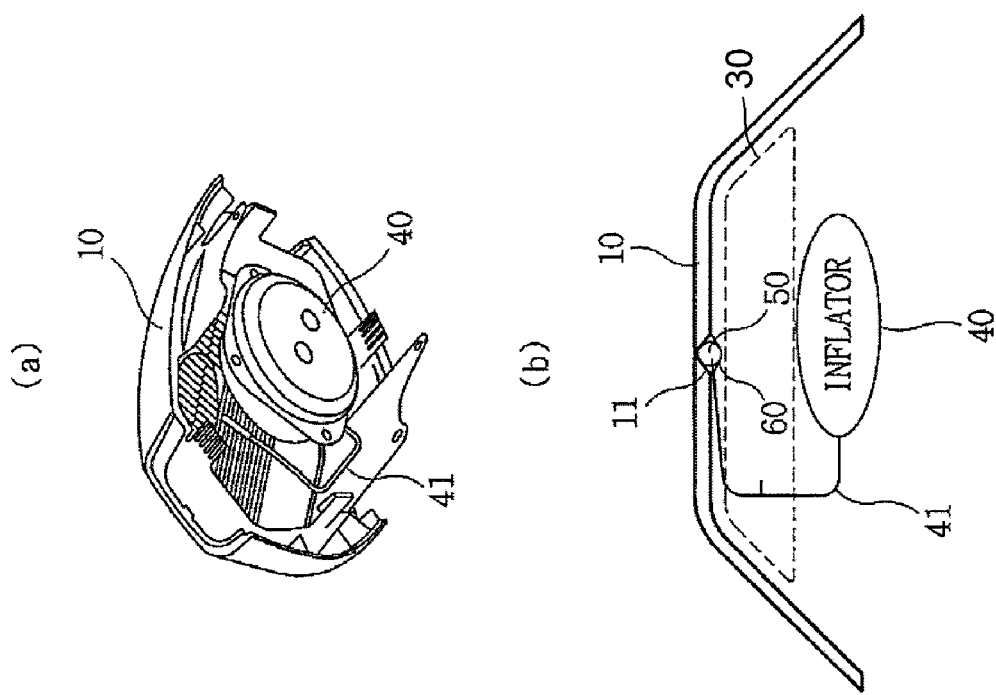
FIG. 2A is a perspective view showing the back side of an exemplary airbag system in accordance with the present invention.
FIG. 2B is a plan cross-sectional view of the airbag system of FIG. 2A in accordance the present invention.

FIG. 2A is a perspective view showing the back side of an airbag system, and FIG. 2B is a plan cross-sectional view of an airbag system in accordance with the present invention. An airbag system includes an inflator 40 that injects gas into an airbag 30 to inflate the airbag 30. The airbag 30 is connected to inflator 40 and is folded so as to be easily deployed during the gas injection. A cover 10 covers the folded airbag 30 to protect the airbag 30. A tear seam 11 is formed on a lower portion of cover 10 so that the airbag 30 is easily deployed at an early stage of deployment as the tear seam 11 is torn by pressure applied from the airbag 30.

According to various embodiments, an inflation tube 50 formed of a material having excellent elasticity (for example, rubber film) is inserted into tear seam 11 as a previously-pressing member. The previously-pressing member applies pressure to the tear seam 11 before the airbag 30 fully expands. A fixing film 60 is attached to the lower portion of the airbag cover 10 to cover the inflation tube 50 so that the inserted inflation tube 50 is firmly maintained at the airbag cover 10. In various embodiments, the previously-pressing member is pre-compressed by a predetermined elastic force or pressure, meaning the member is compressed before assembly adjacent the tear seam.

In various embodiments, the inflation tube 50 may be compressed with some elasticity before the fixing film 60 is attached to the lower portion of the airbag cover 10, but the gas supply tube 41 may not be provided. In this case, the fixing film 60 may be so resilient that, as the airbag 30 expands, the airbag 30 provides pressure to the fixing film 60 and then the elastically pre-compressed inflation tube 50 may extend with its pre-compressed elasticity so that a portion of tear seam 11 having the smallest thickness may be torn with the elasticity force of the inflation tube 50 and the pressure of the airbag 30 before the airbag 30 fully expands.

In various embodiments, the inflation tube 50, i.e., a previously-pressing member, is not be pre-compressed but instead is connected to a gas outlet of inflator 40 through a gas supply tube 41 (e.g. FIG. 2) so that the inflation tube 50 may expand quickly as gas is supplied to the inflation tube 50.

In various embodiments, the inflation tube 50 is pre-compressed with some elastic force before the fixing film 60 is attached to the lower portion of the airbag cover 10 and the gas supply tube 41 may be provided thereto. In this case, the elastically pre-compressed inflation tube 50 may extend with its pre-compressed elasticity and gas pressure supplied by the inflator 40 through the gas supply tube 41 so that a portion of tear seam 11 having the smallest thickness may be torn fast before the airbag 30 fully expands. Accordingly, the time response of the inflation tube 50 can be further improved.

Meanwhile, the inflation tube 50 may be provided only at tear seam 11 that is provided at the central portion of cover 10. Alternatively, tube 50 may be provided at the entire tear seam 11 that is provided throughout the lower portion of cover 10 in a predetermined pattern. That is, the inflation tube 50 may be formed in the same shape as tear seam 11 and inserted into tear seam 11 and extending along most or all of the seam.

In various embodiments, if the fixing film 60 has a large area so as to cover the entire lower portion of cover 10, it may be possible to improve the convenience of assembly.

Furthermore, a plurality of gas supply tubes 41 may be provided and configured to be connected to several positions of inflation tube 50.

Meanwhile, gas supply tube 41 through which high-pressure inflation gas is supplied may be formed of a metal pipe or a high-pressure plastic tube.

The operation of the apparatus according to the present invention will now be described.

When an airbag control unit senses collision of the vehicle and activates the inflator 40, inflation gas generated from the inflator 40 begins to be injected into the airbag 30 and into the inflation tube 50 through gas supply tube 41 substantially at the same time.

The inflation tube 50, which has a gas receiving volume smaller than that of the airbag 30, begins to be inflated before the airbag 30 fully expands. Accordingly, the tear seam 11 of the airbag cover 10 is torn due to the expansive force of the inflation tube 50 and/or the pre-compressed force of the inflation tube 10 before the airbag 30 fully expands.

Figure 3:
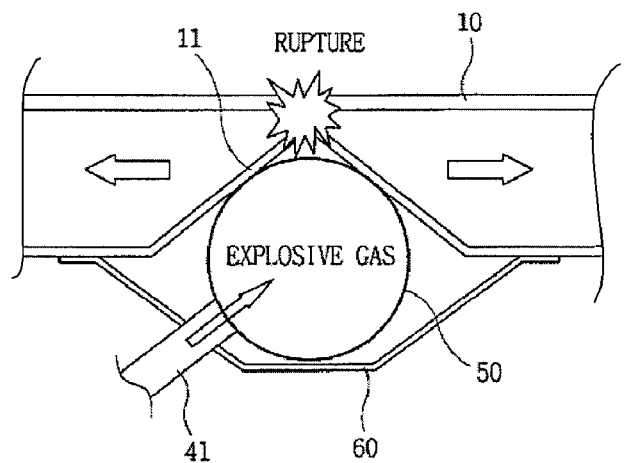
FIG. 3 is an enlarged cross-sectional view of exemplary components of the airbag system of FIG. 2A, illustrating deployment according to the present invention.

That is, when the expansive force and/or the pre-compressed force of the inflation tube 50 is applied to an inclined inner surface of tear seam 11 as shown in FIG. 3, a portion of tear seam 11 having the smallest thickness is torn.

In this case, if fixing film 60 is made of a material having tensile strength larger than that of tear seam 11, the fixing film 60 may support inflation tube 50 without being torn during the inflation of inflation tube 50, so that the expansive force of the inflation tube 50 is concentrated on tear seam 11.

Therefore, since tear seam 11 has already been torn partially or entirely when the airbag began to apply pressure to tear seam 11, the airbag cover 10 does not suppress the inflation of the airbag 30.

For this reason, the airbag 30 is deployed to protrude toward the outside of airbag cover 10 through the torn tear seam 11 in proportion to the increase of the amount of injected inflation gas. Accordingly, unlike in the related art, the airbag cover 10 is not suppressed until tear seam 11 is torn since the tear seam 11 is torn before the airbag 30 fully expands. Thus, system may be configured such that the airbag cover does not significantly suppress the inflation function.

Figure 4:
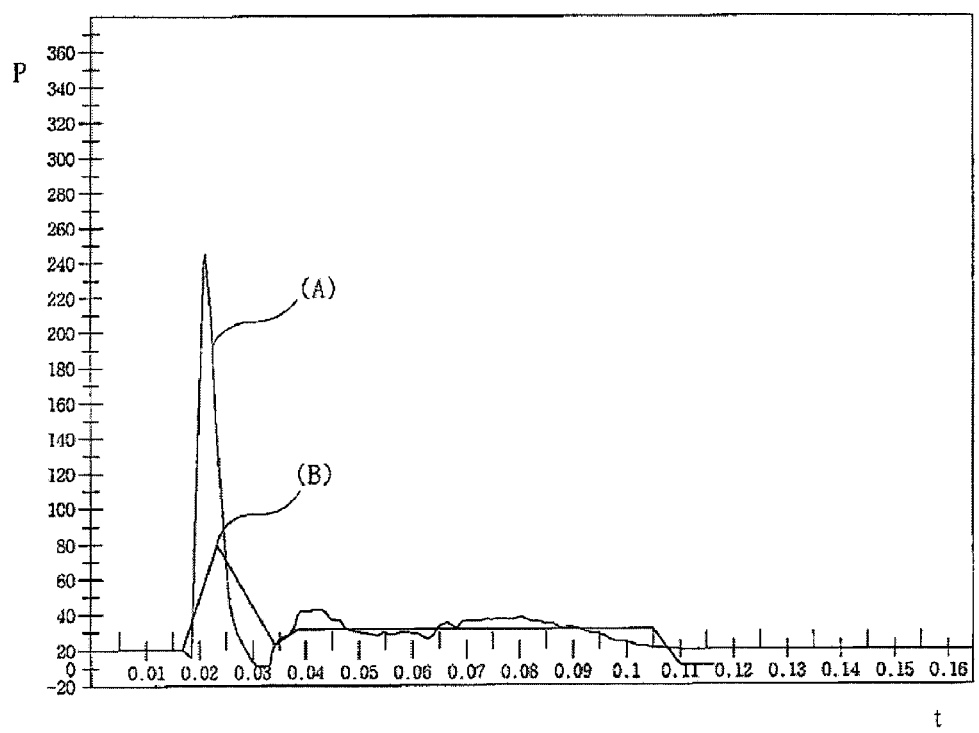
FIG. 4 is a comparative graph of pressure variation vs. time during unfolding of airbag, illustrating performance of an airbag system in accordance with the present invention versus a conventional system.

For this reason, when the airbag 30 protrudes outwards from the airbag cover 10, a value of peak pressure is significantly decreased as shown by line (B) in FIG. 4 illustrating the above embodiments as compared to a line (A) in the related art.

The peak pressure of the airbag, which is inflated and deployed as described above, may thus be significantly decreased. For this reason, even though the airbag to be deployed hits a passenger, the amount of impulse caused by the airbag is decreased and generally not as large. As a result, serious injury to the passenger may be avoided or reduced. That is, it is possible to obtain an advantage of improving the safety of the airbag system.

For convenience in explanation and accurate definition in the appended claims, the terms "upper", "lower", "front", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for decreasing peak pressure of an airbag, the device comprising:
    an airbag;
    an airbag cover receiving the airbag therein to protect the airbag;
    a tear seam formed on the airbag cover and configured to be torn by pressure applied from the airbag; and
    a pre-compressed member positioned near the tear seam to apply pressure to the tear seam before the airbag is fully inflated,
    wherein the pre-compressed member includes an inflation tube formed from a pre-compressed elastic material,
    wherein the pre-compressed member is supplied with a part of a gas provided to the airbag to apply the pressure to the tear seam,
    wherein the inflation tube that is provided near the tear seam and is connected to an inflator that supplies gas to the airbag by a gas supply tube,
    wherein the inflation tube is mounted by a fixing film coupled to the airbag cover, and
    wherein the fixing film supports the inflation tube without being torn during inflation of the inflation tube so that the expansive force of the inflation tube is concentrated on the tear seam while the airbag is deployed.

2. The device as defined in claim 1, wherein the fixing film is made of a material having tensile strength larger than that of the tear seam.

3. The device as defined in claim 1, wherein the inflation tube has a gas receiving volume smaller than that of the airbag so that the response time of the inflation tube is shorter than that of the airbag as the gas is supplied from an inflator thereto.

4. The device as defined in claim 1, wherein the pre-compressed member is supported by the fixing film coupled to a lower portion of the airbag cover.

5. The device as defined in claim 1, wherein the pre-compressed member is provided at the tear seam that is provided at central portion of the airbag cover.

6. The device as defined in claim 1, wherein the pre-compressed member is provided along the entire tear seam that is provided throughout the lower portion of the airbag cover in a predetermined pattern.

7. An airbag deployment system for decreasing peak pressure of an airbag, comprising the device defined in claim 1.

8. A passenger vehicle comprising the device as defined in claim 1.

9. The device as defined in claim 1, wherein the tear seam is formed at a lower portion of the airbag cover, the tear seam having a smaller thickness than a thickness of the airbag cover.

10. A passenger vehicle comprising the airbag deployment system as defined in claim 9.

11. The device as defined in claim 1, wherein the tear seam comprises at least two lateral sides having an acute angle therebetween to form the small thickness and receives the pre-compressed member therebetween.

12. The device as defined in claim 1, wherein tear seam is configured to tear by a pressure from the pre-compressed member before the airbag is fully deployed.

* * * * *